(12) United States Patent
Wang

(10) Patent No.: US 11,649,069 B2
(45) Date of Patent: May 16, 2023

(54) AIRPORT CAPABLE OF SAVING ENERGY AND RESOURCES AND IMPROVING TAKE-OFF AND LANDING SAFETY OF AIRPLANE

(71) Applicant: Zhenkun Wang, Marblehead, MA (US)

(72) Inventor: Zhenkun Wang, Marblehead, MA (US)

(*) Notice: Subject to any disclaimer, the term of this patent is extended or adjusted under 35 U.S.C. 154(b) by 27 days.

(21) Appl. No.: 17/468,939

(22) Filed: Sep. 8, 2021

(65) Prior Publication Data
US 2022/0340301 A1 Oct. 27, 2022

(30) Foreign Application Priority Data

Apr. 26, 2021 (CN) .......................... 202120880849.8

(51) Int. Cl.
B64F 1/36 (2017.01)
(52) U.S. Cl.
CPC ....................................... B64F 1/36 (2013.01)
(58) Field of Classification Search
CPC ....................................... B64F 1/36; B64F 1/00
See application file for complete search history.

(56) References Cited

U.S. PATENT DOCUMENTS

| | | | | |
|---|---|---|---|---|
| 1,395,612 A | * | 11/1921 | Stewart ..................... | B64F 1/36 244/11 OR |
| 1,813,986 A | * | 7/1931 | Breeze ..................... | B63B 35/50 244/114 R |
| 2,750,135 A | * | 6/1956 | Anderson ................. | B64F 1/00 244/114 R |
| 4,267,991 A | * | 5/1981 | Taylor ...................... | B64F 1/36 244/114 R |
| 4,799,828 A | * | 1/1989 | Georgii .................... | E02B 17/00 405/203 |
| 2009/0200421 A1 | * | 8/2009 | Virkar ..................... | G08G 5/065 244/114 R |

FOREIGN PATENT DOCUMENTS

| | | | | |
|---|---|---|---|---|
| ES | 2247904 B1 | * | 2/2007 | ............... B64F 1/00 |
| IN | 200601250-13 | * | 10/2007 | ............... B64F 1/00 |
| WO | WO-2008062425 A2 | * | 5/2008 | ............... B64F 1/00 |

OTHER PUBLICATIONS

Elham et al. "Vertically Curved Runways for Reducing Airport Environmental Impact and Increasing Aircraft Productivity" (Year: 2015).*

* cited by examiner

*Primary Examiner* — Assres H Woldemaryam
(74) *Attorney, Agent, or Firm* — WPAT, PC

(57) ABSTRACT

The present invention discloses an integrated airport design. The runways are designed in an elevated curved shape. The middles of landing runways and take-off runways are designed as an overhead parking apron, and the terminal building is below the runways. Therefore, the usable area of the whole airport is increased. The length of each elevated curved runway is lengthened comparing to the traditional straight runway within the same area. In addition, the downhill take-off runway can enhance take-off operation and reduce the fuel consumption. Thus, the existing land resources can be used to the maximum extent.

12 Claims, 18 Drawing Sheets

AIRPORT CAPABLE OF SAVING ENERGY AND RESOURCES AND IMPROVING TAKE-OFF AND LANDING SAFETY OF AIRPLANE

TECHNICAL FIELD

The present invention discloses a novel airport capable of saving energy and resources and improving take-off and landing safety of an airplane, and relates to the field of airport architecture design.

BACKGROUND

The modern airport has several problems: safety during landing, and high technical requirements on pilots. When an airplane lands, a large amount of kinetic energy is wasted since braking and friction between airplane tires and the ground are needed to make the airplane stop during landing; and meanwhile, when taking off, the airplane needs to reach the take-off speed in a short time and on a runway, and a large amount of fuel is consumed due to the fact that an airplane engine needs to run at full load.

Land resources are particularly scarce for cities, but the length of the runway for take-off and landing of the airplane may not be shortened, and the land for the parking apron, the terminal and the runway cannot be integrated to save the land. Modern flights are busy, and a large amount of time of the passengers is wasted due to waiting in the air. There is no device to help improve working efficiency of the airplane engine and save fuel when the airplane takes off.

SUMMARY

Aiming at the problems in the modern airport, the present invention integrates the existing airport runway, apron, and terminal building, and designs the runway accordingly. The present invention designs the runway into an elevated curved shape, and designs the middles of landing runways and take-off runways as an overhead apron above and a terminal building below. Therefore, the percentage of the usable area of the whole airport is increased, the length of each runway is lengthened and land is saved under the condition of the same land usable area, and the downhill type take-off runway can reduce the fuel consumption and save energy along with facilitating boarding and transferring passengers. Thus, the land resources can be used to the maximum in a small area.

The curved runway is formed by digging a landing runway downwards to form a downhill landing runway. All the dug soil is used for filling up the parking apron. The parking apron is located at the top of a slope, namely an overhead parking apron, and below the apron is the overall structure of the terminal building. People go up to the overhead parking apron from inner tunnels of the overhead parking apron and the terminal building through elevators. During the landing, an airplane first lands on a descending landing runway, taxis along a section of a downhill runway and then along an upward uphill ascending deceleration runway to rush to the parking apron at the top of the slope. The braking is basically not needed or minimized after the whole landing, and the airplane is maintained to naturally decelerate along the ascending runway until reaching the overhead parking apron. In this way, the kinetic energy of the airplane after landing is collected and stored as potential energy.

For taking off, the airplane has a certain potential energy from the gravitational potential energy of passengers and goods, and the kinetic energy from the downward take-off runway, thereby helping the airplane save energy during take-off. When the airplane rushes downwards from the overhead parking apron to take off, the potential energy collected during landing is converted into the kinetic energy again in this form, the fuel consumption of the airplane during take-off is reduced, and the purpose of saving energy has been achieved. Therefore, the design of the curve-shaped overhead parking apron maximizes energy savings.

Further, the curved runway provided the extension of the runway without increasing the land area. Because the length of a curve is greater than that of a straight line between two points, the land for the runway may be saved.

Among the landing runways, an emergency runway is additionally arranged between each two adjacent landing runways. The emergency runway is not used at ordinary times and is only used when an airplane encounters a malfunction and needs emergency landing. Because the emergency runway is provided with a fluid material which can release flame retardance and has a certain viscosity, the airplane can be prevented from burning and explosion during emergency landing. In addition, because the fluid material has a certain viscosity, the emergency runway can help the airplane stop as soon as possible.

Since the emergency runway between each two adjacent runways is not used as ordinary times, the distance between two adjacent landing runways is wide enough, and therefore all landing runways can be used at the same time. Thus, the service efficiency of the airport is improved.

The landing safety can be improved when the airplane lands on the descending ramp. When the airplane lands on a horizontal runway, in order to enable back wheels of the airplane to land first for reducing landing impact force to the airplane and improving landing safety, a pilot is required to raise the nose of the airplane to maintain a certain upward elevation angle, which is technically challenging. When the elevation angle of the nose is not properly controlled, a "hard" landing may occur, which increases impact damage and danger to the airplane. In contract, when landing on a descending ramp, the back wheels can naturally land first only needing to maintain level flight of the airplane. In addition, the wheels of airplane can roll due to the descending ramp when landing, and the impact force of the runway to the airplane is smaller than that to the airplane landing on the horizontal ramp.

The overhead parking apron adopts a way of parking the airplanes to the two sides, and empty spaces on the two sides of the middle emergency runway can be used for parking the airplanes. Thus, the parking is convenient and land is saved.

People and goods can enter the parking apron and the terminals through the tunnels and then are dispersed to directly reach the corresponding airstairs through the elevators. Thus, transition and transfer in the airport are avoided, and both time and energy are saved.

Due to the multi-directional take-off runways, airplanes in different directions can take off according to needs at the same time without interference. Thus, the service efficiency of the airport is improved.

The airport design according to the present invention also reduces the fuel consumption for the airplane to takes off. Gravitational potential energy of the airplane itself and people and goods on the airplane can be converted into kinetic energy by means of the descending runway, thus, the speed of the airplane is increased and fuel of an airplane engine is saved. Further, when a part of high-speed air sprayed from a nozzle of the airplane engine is sprayed to a slope plane, the slope plane provides a reaction force, namely forward thrust, to the airplane according to the Newtonian mechanics principle, and the forward thrust is additionally obtained; that is, the whole descending ramp is like a boosting fence which always follows the rear part of the airplane engine; in this way, the fuel efficiency of the airplane engine can be improved, and the fuel is saved when the airplane takes off.

A hovering zone is provided. The hovering zone with a certain height (such as 3000 m-5000 m) and a certain radius (determined according to an actual situation of the airport) is arranged above the airport. All take-off airplanes need to avoid the hovering zone, that is, the airplanes cannot climb too fast during take-off, and the airplanes can reach the lower limit height of hovering after flying beyond the radius of the hovering zone during take-off. When approaching the hovering zone, the landing airplanes fly in the hovering zone at a certain speed after entering the hovering zone in a take-off direction (the anticlockwise direction in the figure) to wait for landing instructions. When receiving the landing instructions, the airplanes sequentially leave the hovering zone according to the directions of the landing runways and enter the landing runways. Therefore, there is no any airway intersection above the airport, and the safety and the service efficiency of the airport are improved.

BRIEF DESCRIPTION OF THE DRAWINGS

FIGS. 2-1 to 2-4 are diagrams of an airplane during landing.

FIGS. 3-1 to 3-2 are cross-sectional and front diagrams of an airport.

FIGS. 4-1 to 4-4 are diagrams of a terminal building of an airport.

FIGS. 5-1 to 5-3 are diagrams of runways, a parking apron, and an air traffic control hovering zone.

FIGS. 6-1 to 6-2 are diagrams about take-off of an airplane on a descending take-off runway.

DETAILED DESCRIPTION OF THE INVENTION

To further understand the technical solutions of the present invention, the present invention will be further described with reference to the accompanying drawings.

Figure 1:
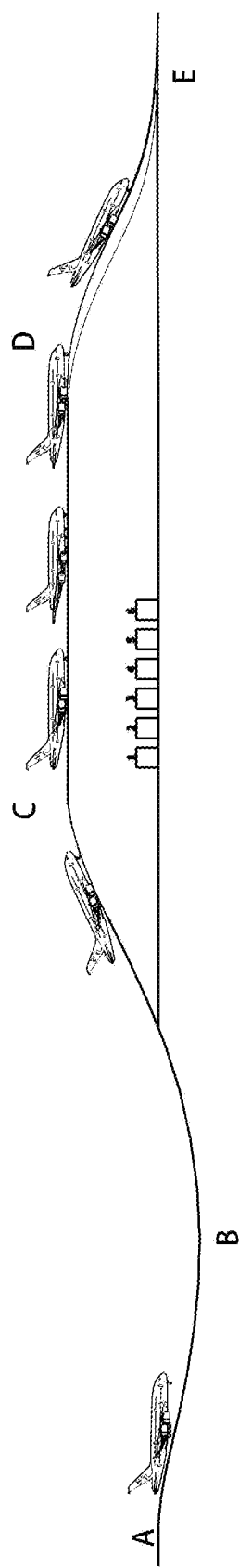
FIGS. 1-1 to 1-3 are cross-sectional, front and top diagrams of a curved airport.
Figures 1, 2:
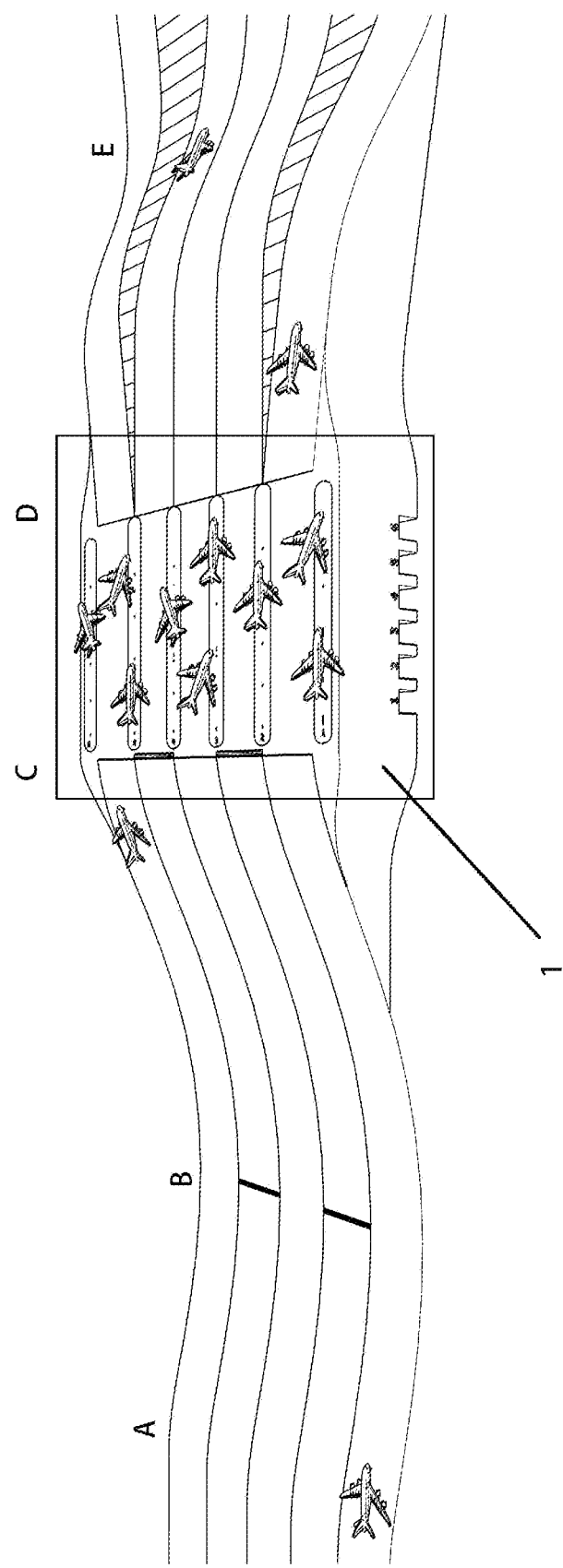
Figures 1, 2, 3:
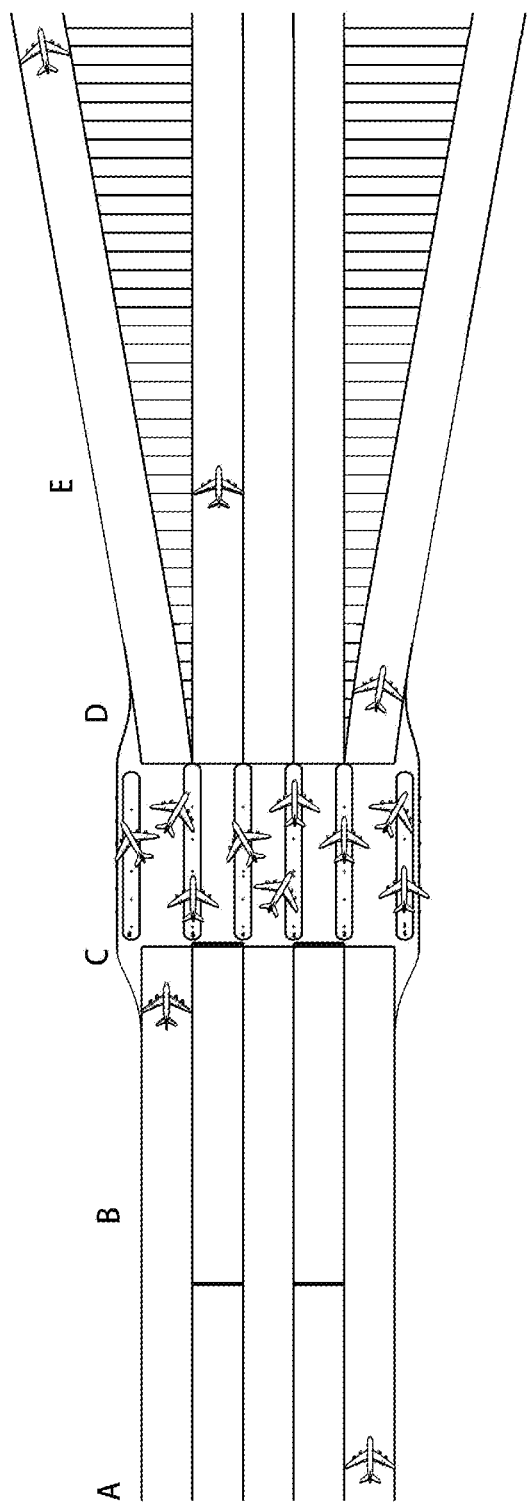

FIGS. 1-1 to 1-3 are illustrating a novel airport capable of saving energy and resources and improving take-off and landing safety of an airplane, in which runways, a parking apron and a terminal are integrated. In a cross-sectional diagram of FIG. 1-1, it can be clearly seen that the novel airport has an elevated curve-shaped design structure. The length of an elevated curve line is greater than a horizontal straight line within the same area, that is the curved runways AB+BC+CD+DE is greater than the land occupation length AE.

As shown in a front diagram of FIG. 1-2, the overhead parking apron and the terminal building are integrated 1, wherein the upper part is the overhead parking apron and the lower part is the terminal building. As shown in a top diagram of FIG. 1-3, the landing runway and the take-off runway are separated by the overhead parking apron; A to B is a downward descending landing runway, B to C is an upward ascending landing runway, C to D is an overhead parking apron, and D to E is a take-off runway.

Figures 1, 2:
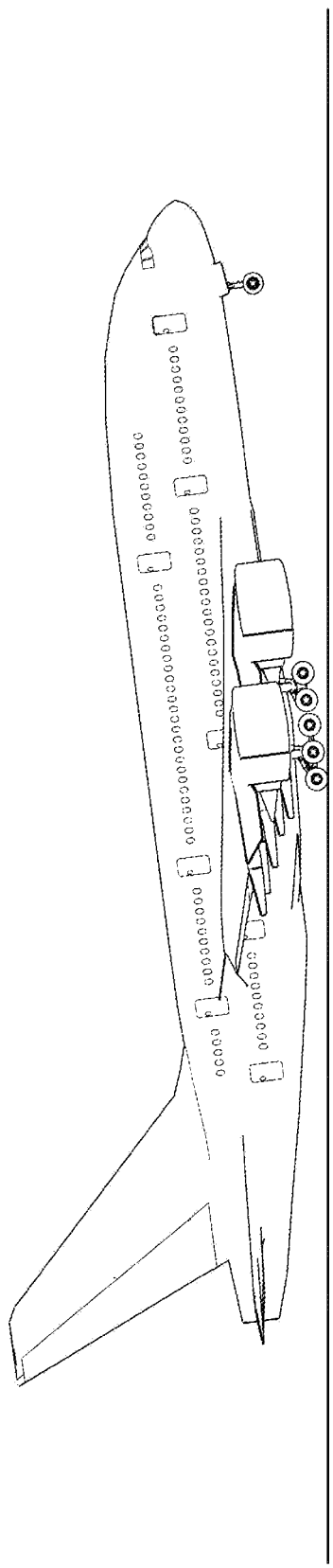
Figure 2:
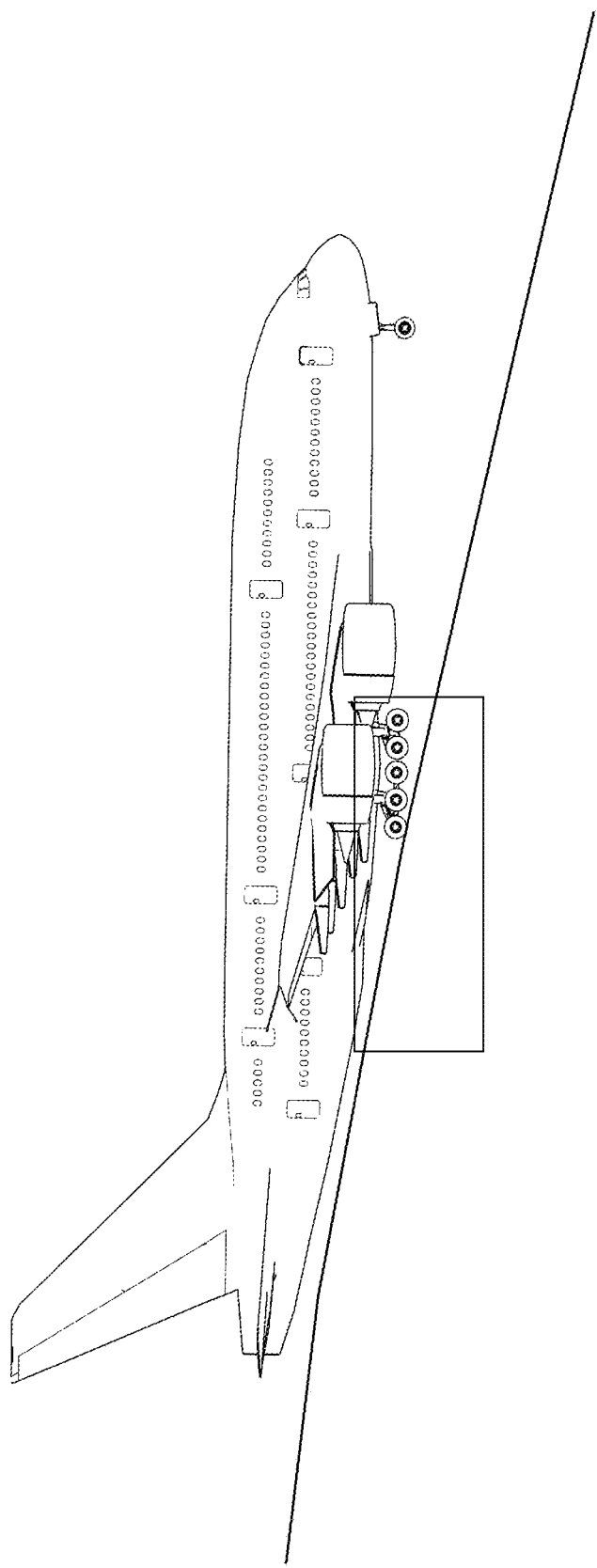
Figures 2, 3:
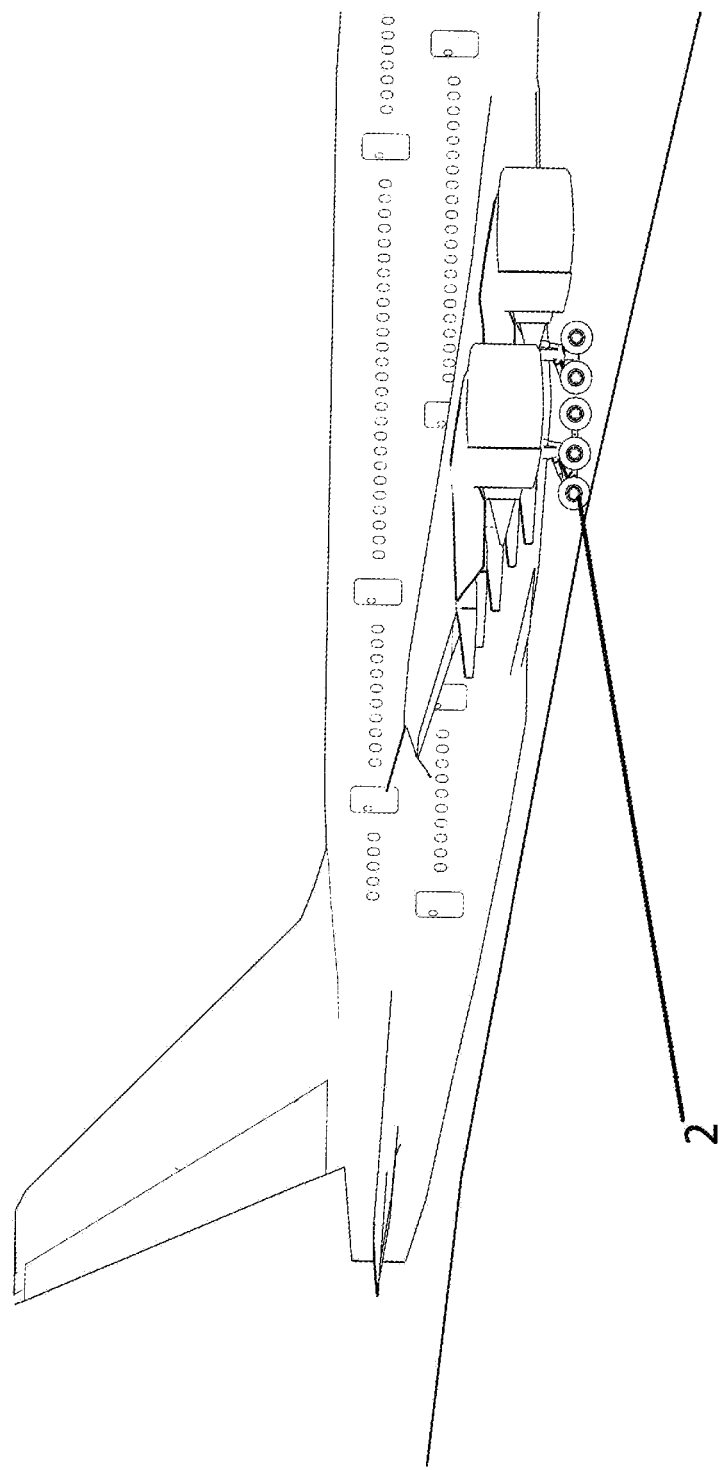
Figures 2, 3, 4:
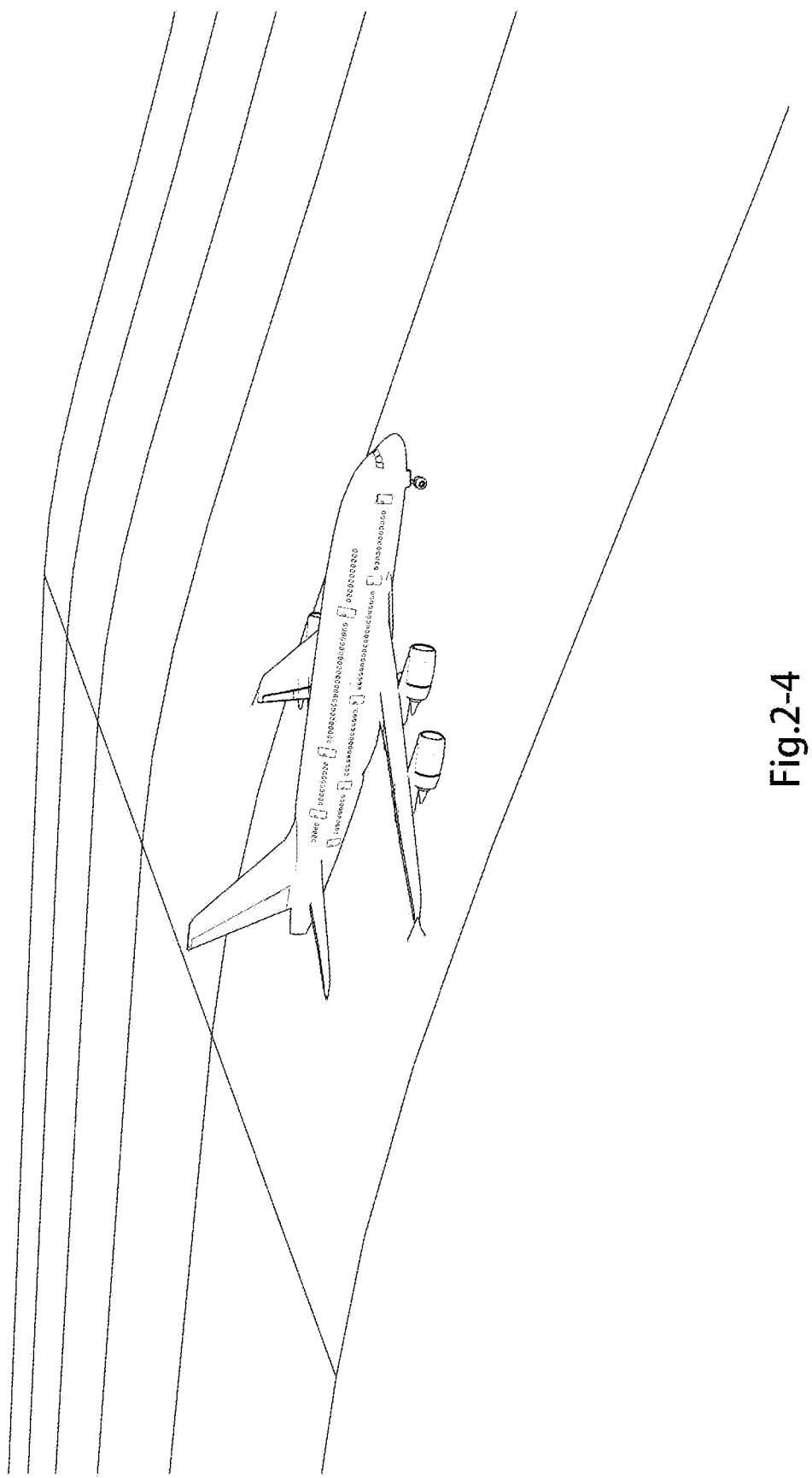
Figures 1, 3:
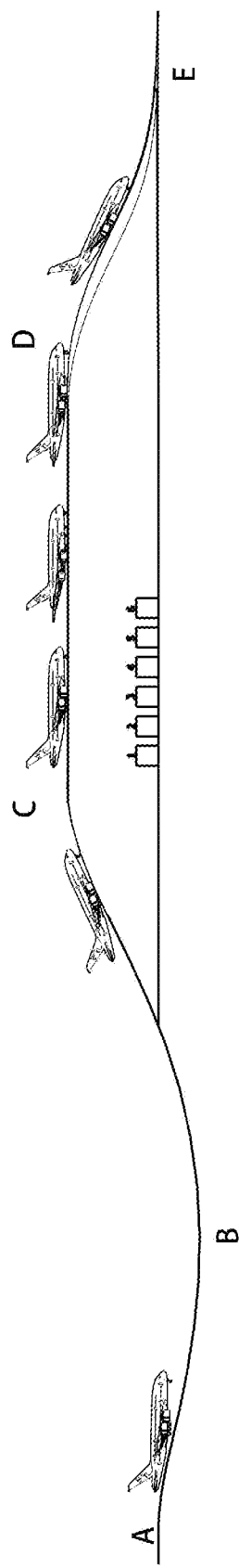
Figures 2, 3:
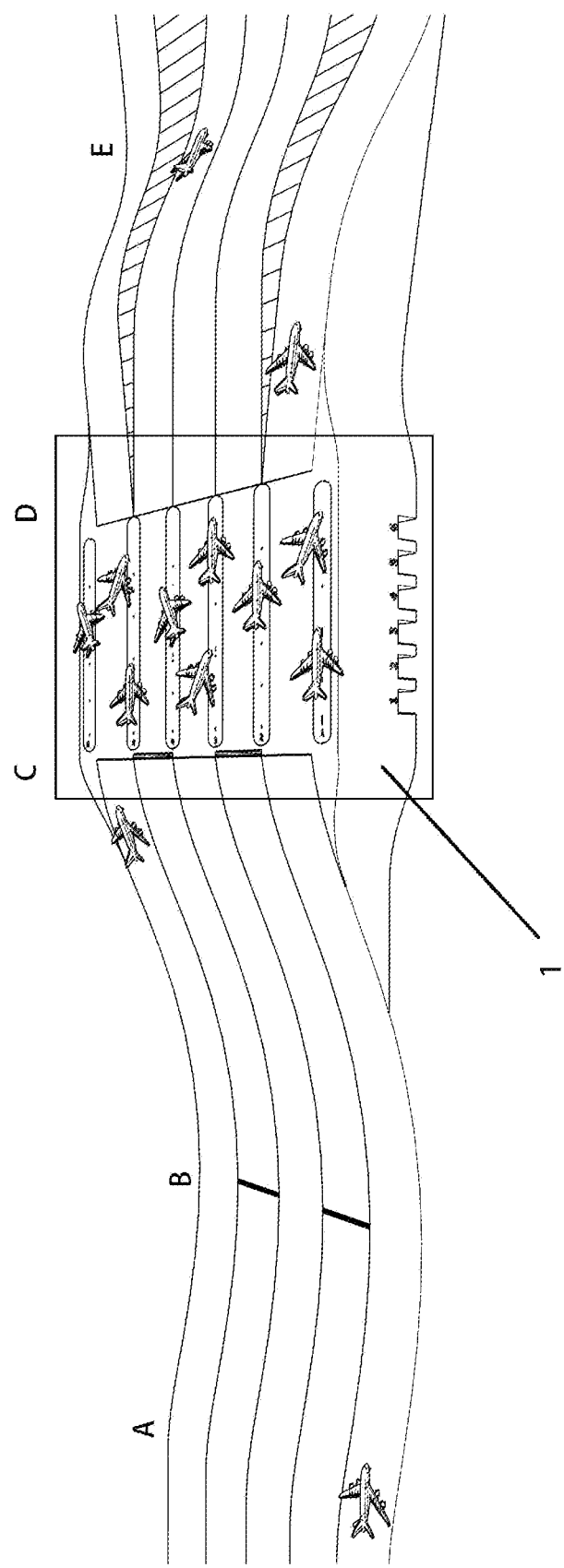
Figures 1, 4:
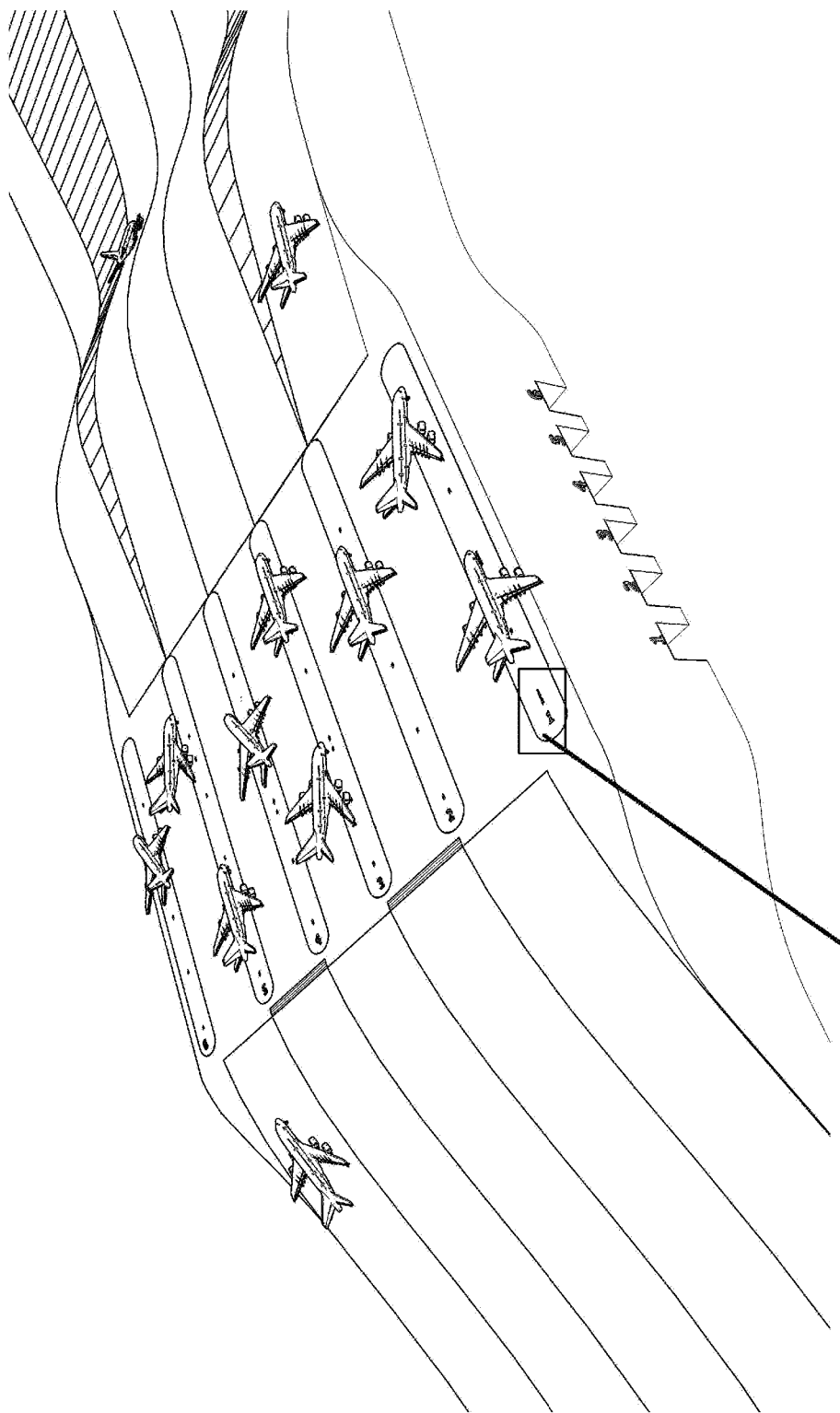
Figures 2, 4:
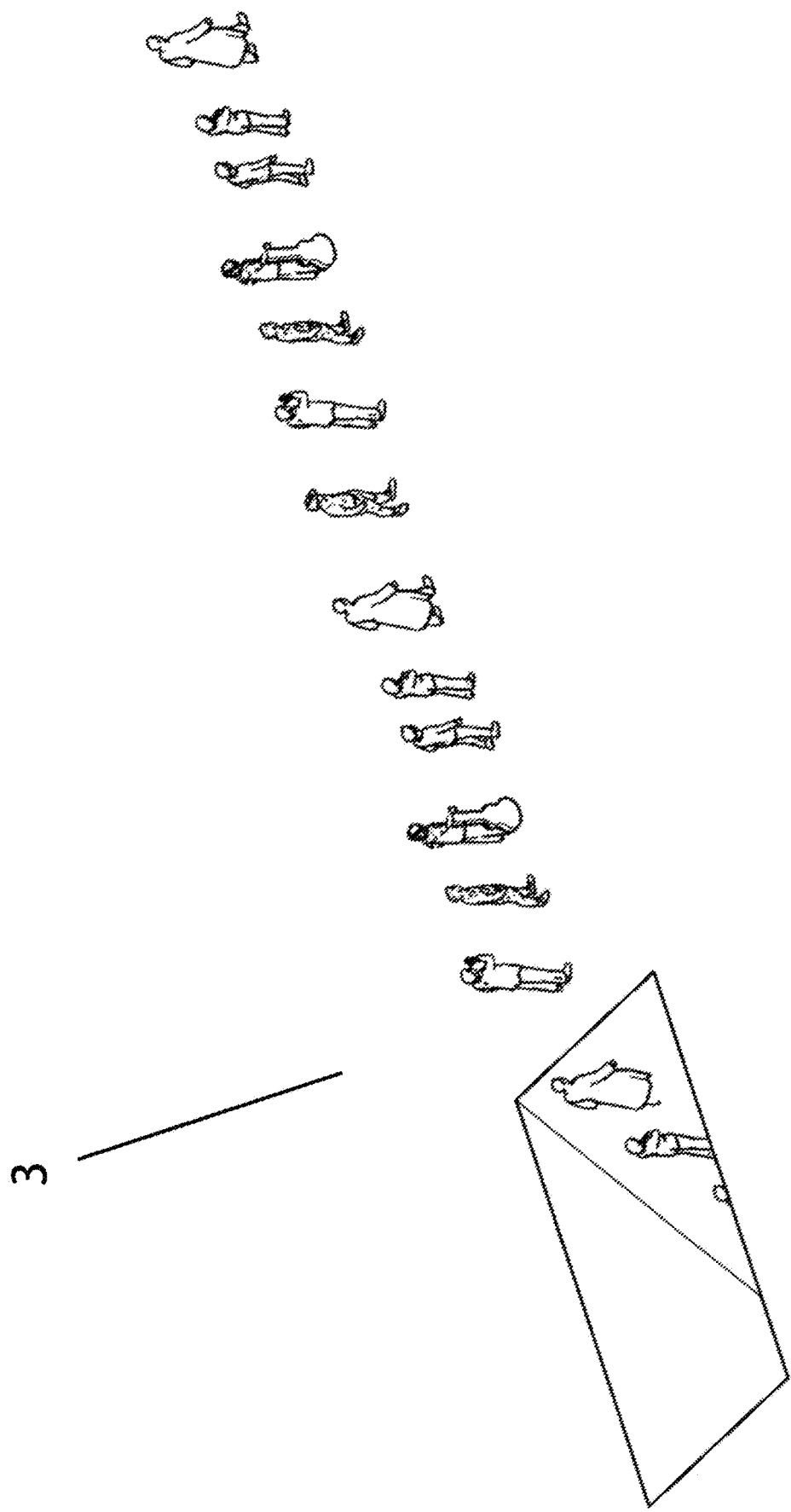
Figures 3, 4:
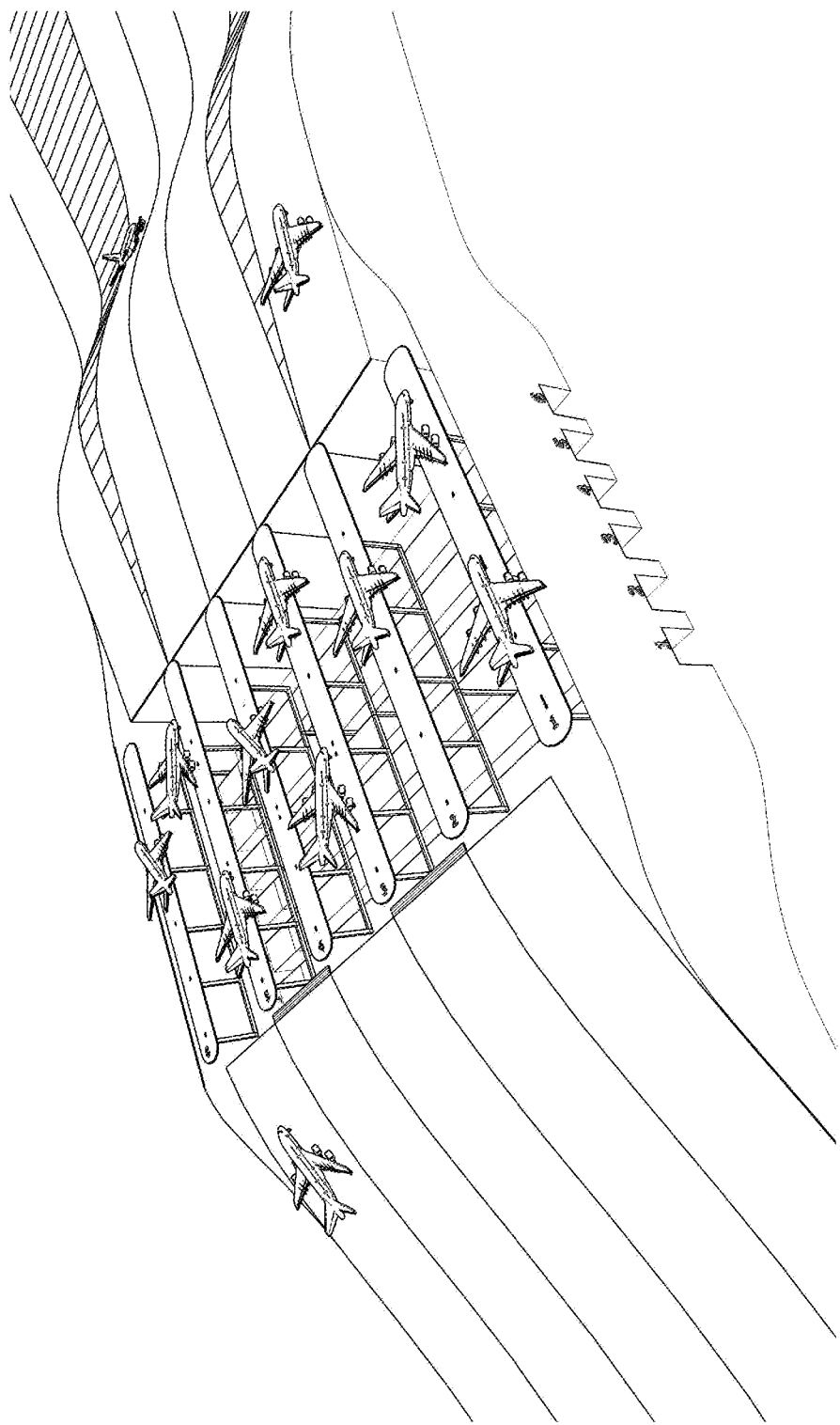
Figure 4:
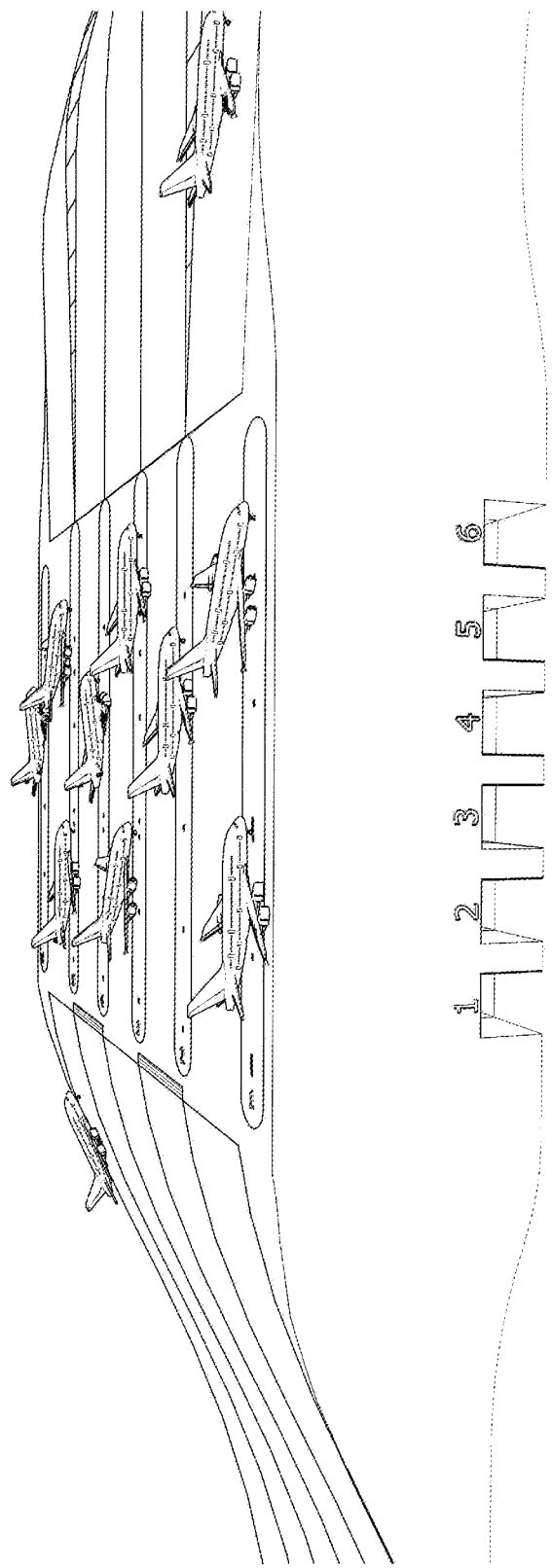

FIGS. 2-1 to 2-4 are diagrams of an airplane during landing. FIG. 2-1 is a diagram of an airplane landing on a flat ground. FIG. 2-2 is a diagram of an airplane landing on a downward descending runway. It can be seen from FIG. 2-3 that when the airplane lands on the downward descending ramp, although the airplane is maintained at a parallel state, the back wheels of the airplane land on the ground and the front wheels do not touch the ground as the airplane is on a slope plane. That is, by changing an angle of the landing runway and changing the runway from a plane to a downward inclined plane, the airplane can maintain a horizontal flight while meeting the requirement of making the back wheels of the airplane land first during landing, thereby reducing the risk of landing on the flat ground. FIG. 2-4 is a diagram of an airplane landing on a ramp. Because the runway is a downward ramp, the impact force of the ground to the airplane is reduced, which makes the landing become safer.

FIGS. 3-1 to 3-2 are cross-sectional and front diagrams of the whole airport. An airplane first lands at a point A, then moves downwards from the point A to the point B, and then moves upwards from the point B to the point C. During the period, the airplane completely does not need braking, and kinetic energy of the airplane at the point A can be converted into gravitational potential energy from the point A to the point C. Thus, the airplane can be rapidly stopped, and the potential energy converted from the kinetic energy can be maintained on the parking apron to reserved energy for the take-off of the airplane. After passengers and flight crew are on board the airplane on the parking apron and baggage and goods are all loaded in the airplane for take-off, because point D to point E is a downhill inclined plane, the gravitational potential energy of the airplane itself, the flight crew and the goods on the airplane can be converted into the kinetic energy by means of the descending runway.

FIGS. 4-1 to 4-4 are a diagram of a terminal building of an airport. The top floor of the terminal building is an overhead parking apron. Through the connection of tunnel, passengers and flight crew can enter the terminal building and are directly dispersed to corresponding platforms, and then enter respective boarding gates 3 through elevators from the tunnels. The reference number 3 in the FIG. 4-1 and FIG. 4-2 refers to personnel accesses of the overhead parking apron. In this way, the cost and the trouble caused by the fact that people need to be transferred by a regular bus can be reduced.

Figures 1, 5:
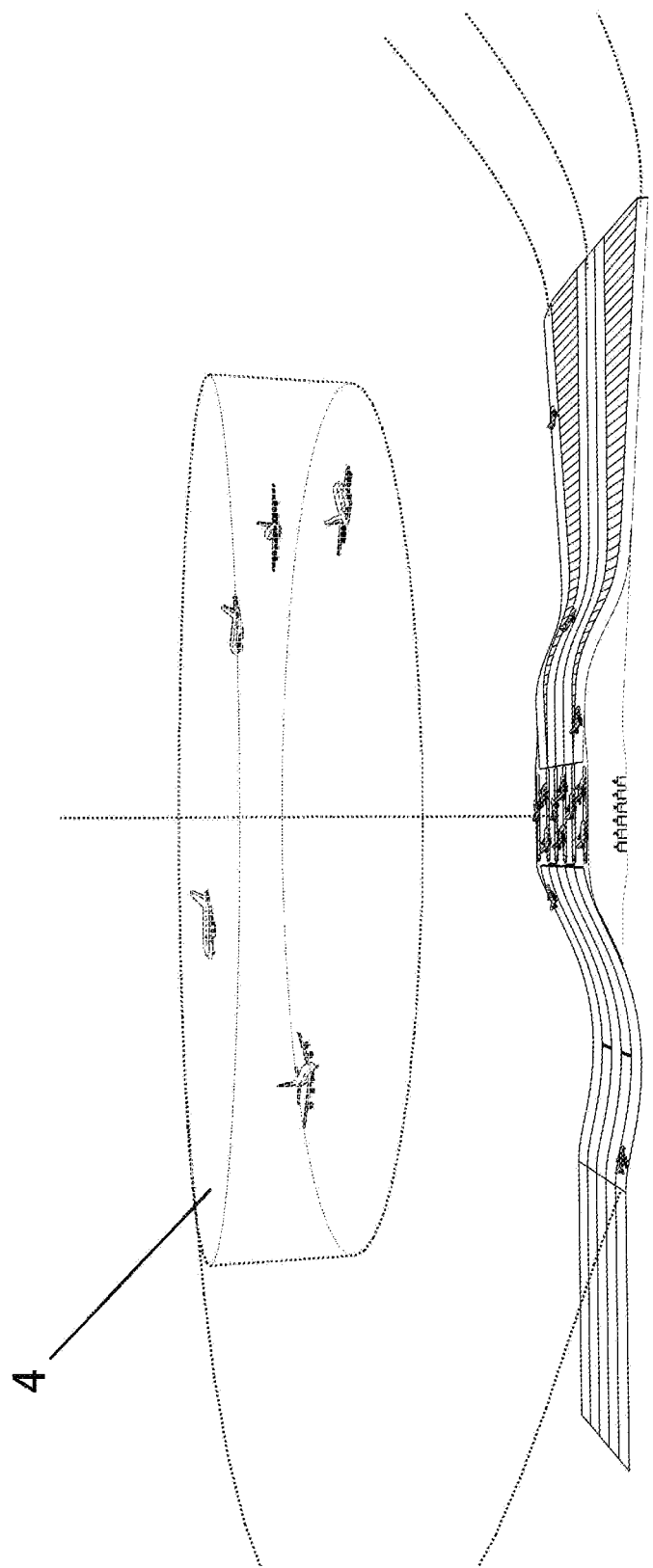
Figures 2, 5:
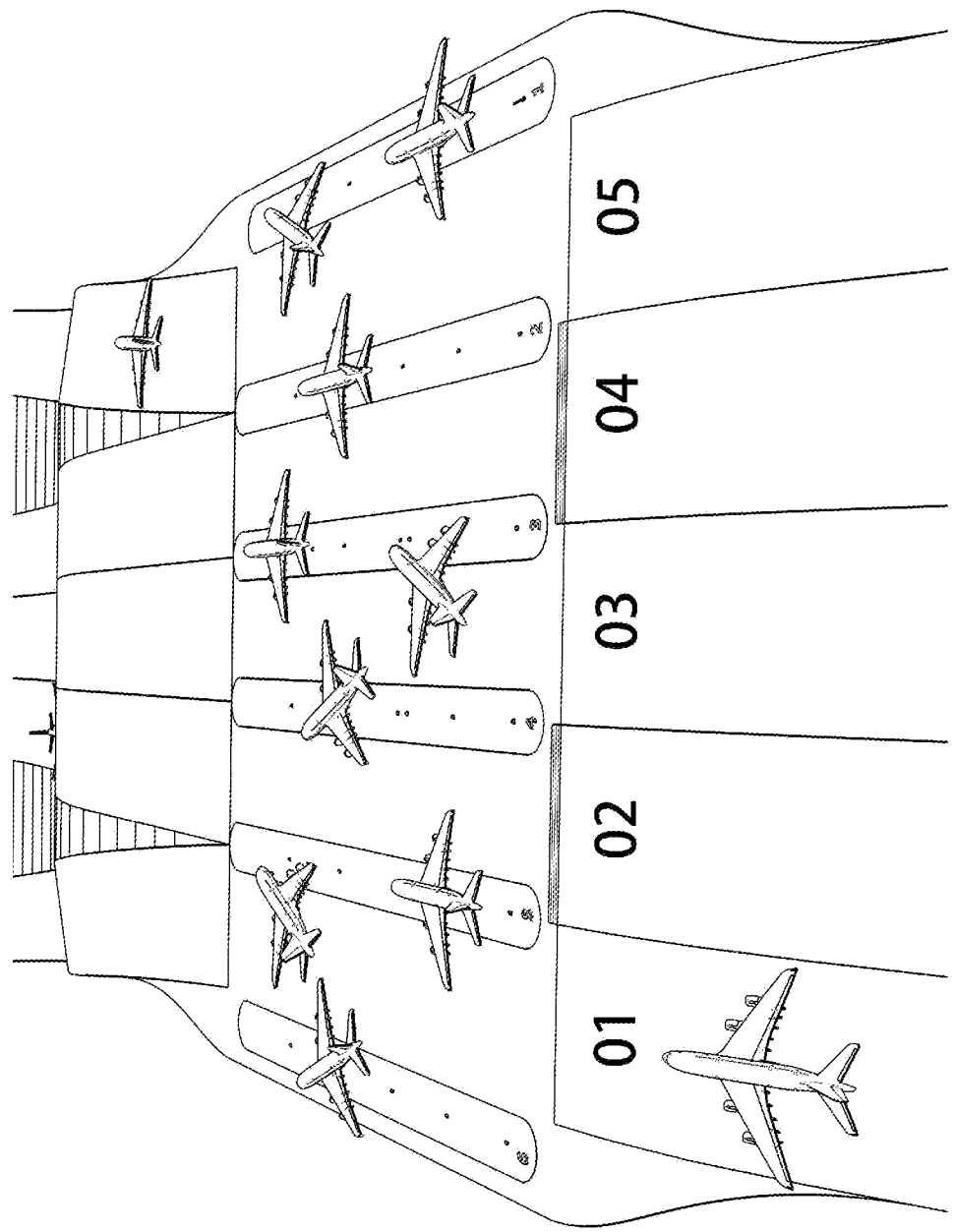
Figures 3, 5:
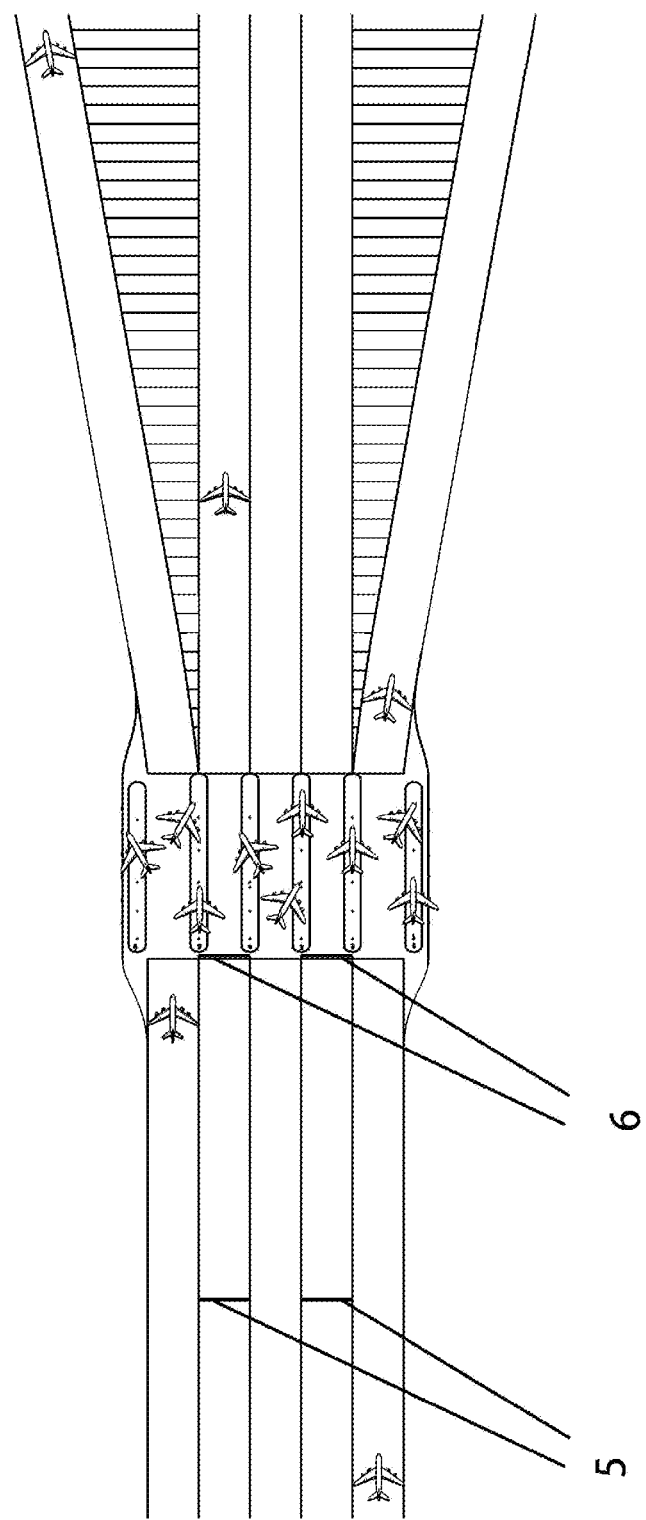

FIGS. 5-1 to 5-3 are diagrams of runways, a parking apron, and an air traffic control hovering zone. It can be seen from FIG. 5-1 that a cylindrical hovering waiting approaching zone 4 is provided above the airport. The height and thickness of the zone may vary slightly depending on the size of the airport. All take-off airplanes should keep away from the zone, and therefore the take-off zone and the landing zone are non-interference. Because there is no any airway intersection above the airport, the safety and the service efficiency of the airport are improved, and waiting time and fuel consumption of airplanes for approaching and departure are saved.

In FIG. 5-2, an airport with five runways is taken as an example. The runways 01, 03 and 05 are used as normal runways, and the runways 02 and 04 are used as emergency runways. The airplane uses the runways 01, 03 and 05 for a normal landing. When the landing on the runway is completed, the airplane directly moves to the parking apron and stops on the two sides of the runway. Thus, the land is saved and the passengers can board the airplane conveniently. The airplane may apply for landing on the emergency runways 02 and 04 when encountering an emergency situation.

The emergency runways are characterized in that the storage tanks 6 in the FIG. 5-3 are storage tanks capable of releasing flame-retardant fluid materials with a certain viscosity. When the airplane with a malfunction lands on one emergency runway, the storage tank 6 is opened to release the flame-retardant material to reduce the possible damage, such as fire or explosion, to the minimum, and the safety of people is maintained to the maximum. Because the storage tank 6 is located above the slope plane, the fluid material can flow downwards to the collection tank 5 of the fluid material along the slope plane when the storage tank 6 is opened. Thus, the fluid material can be recycled.

Figures 1, 6:
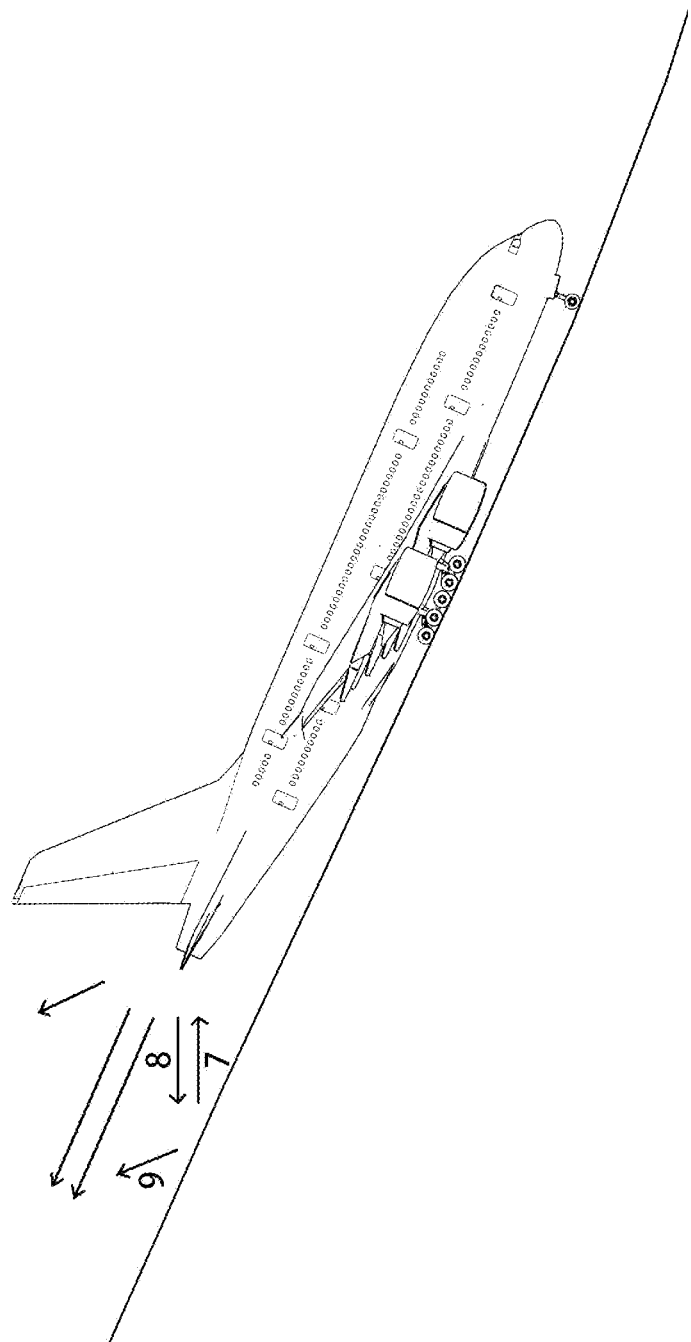
Figures 2, 6:
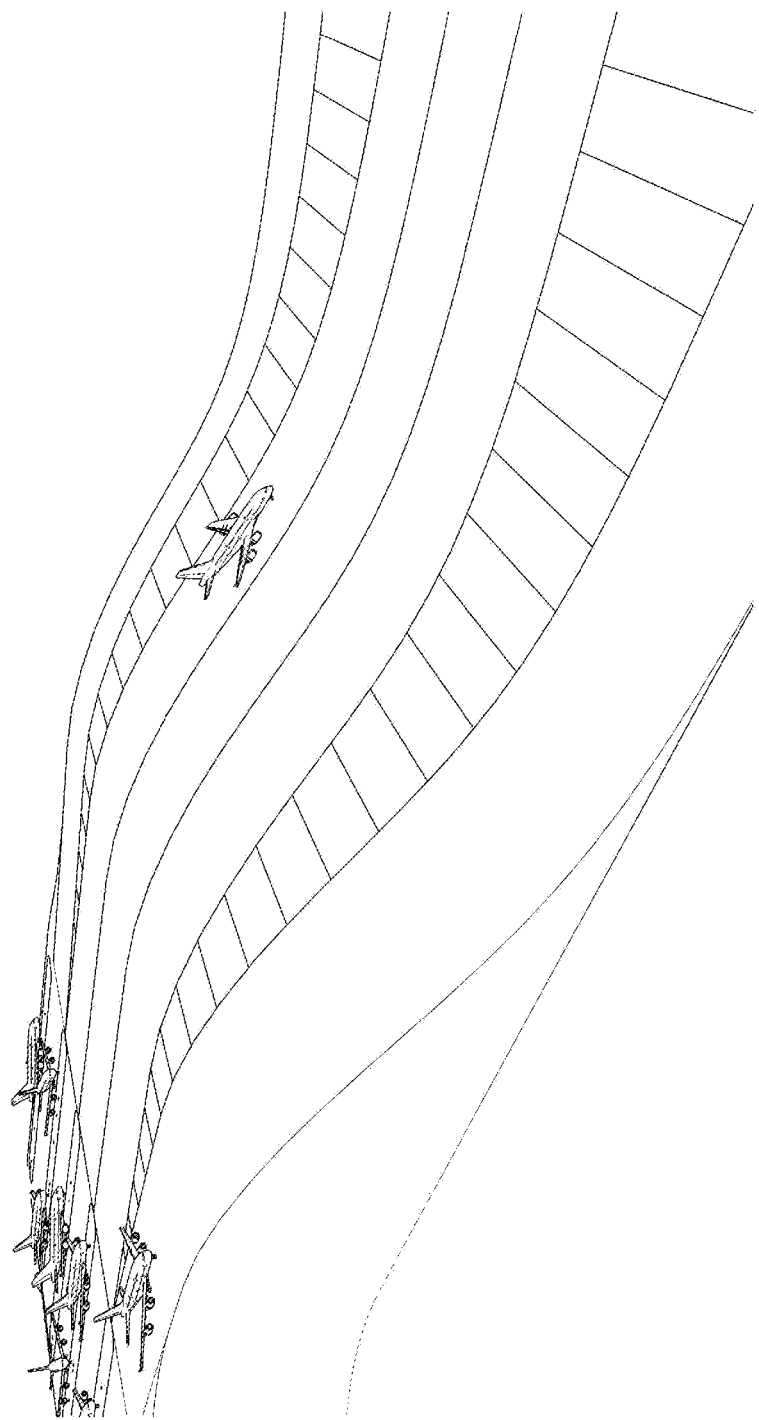

FIGS. 6-1 to 6-2 are a diagram of an airplane taking off on a descending take-off runway. When an airplane takes off, a part 8 of high-speed air ejected from an engine nozzle is ejected to a slope plane. According to the Newtonian mechanics principle, the slope plane provides a reaction force 7, namely forward thrust, to the airplane, wherein the forward thrust is obtained additionally. In other words, the whole descending ramp is like a boosting fence which always follows the rear part of the airplane engine, and therefore, the fuel efficiency of the airplane engine can be improved, and the fuel consumption is saved when the airplane takes off.

The above description of the disclosed embodiments enables those skilled in the art to implement or use this invention. Various modifications to these embodiments will be obvious to those skilled in the art. The general principles defined herein can be implemented in other embodiments without departing from the spirit or scope of this invention. Therefore, this invention will not be limited to the embodiments shown in this article, but should conform to the widest scope consistent with the principles and novel features disclosed in this article.

What is claimed is:

1. An airport for minimizing energy and resources consumption, and improving take-off and landing safety of an airplane, comprising:
    a terminal building with a parking apron, wherein said parking apron is located at a top of said terminal building, and said parking apron is elevated at a first elevation;
    a first elevated runway, including a first section elevated at said first elevation and a second section elevated at a second elevation, wherein said first elevation is higher than said second elevation;
    a second elevated runway, including a third section elevated at said first elevation, a fourth section elevated at said second elevation, and a fifth section elevated at a third elevation, wherein said third elevation is lower than said first elevation and said second elevation, and said third section and fourth section are connected via said fifth section;
    wherein said first section and said third section are separated by said parking apron.
2. The airport as claimed in claim 1, wherein said first elevated runway is a take-off runway.
3. The airport as claimed in claim 1, wherein said second elevated runway is a landing runway.
4. The airport as claimed in claim 1, wherein said second elevation and said third elevation are different.
5. The airport as claimed in claim 1, wherein said second elevated runway further comprises a sixth section spanning a fourth elevation, said fourth elevation is between said first elevation and third elevation, and said third section and said sixth section are connected via said fifth section.
6. The airport as claimed in claim 5, wherein said sixth section, said fifth section, and said third section function as a landing runway.
7. The airport as claimed in claim 6, wherein an airplane keeps a horizontal flight state when landing on said sixth section.
8. The airport as claimed in claim 1, wherein said first section and said second section collectively function as a take-off runway.
9. The airport as claimed in claim 8, wherein when an airplane takes off from said first section toward said second section, a part of air ejected from an airplane engine nozzle is ejected horizontally toward said take-off runway as said airplane inclines.
10. The airport as claimed in claim 1, further comprising:
    a storage tank positioned at said first elevation, wherein said storage tank is adjacent to said second section and stores flame-retardant fluid material; and
    a collection tank positioned at said third elevation and located on said fifth section, wherein said collection tank collects said flame-retardant fluid material after said flame-retardant fluid material is released from said storage tank;
    wherein said second elevated runway is an emergency runway.
11. The airport as claimed in claim 1, further comprising:
    a cylindrical hovering waiting approaching zone positioned above the terminal building and parking apron.
12. The airport as claimed in claim 1, further comprising:
    a third elevated runway;
    wherein said third elevated runway includes a seventh section elevated at said first elevation and an eighth section elevated at said second elevation; and
    wherein said third elevated runway is a take-off runway, and is non-parallel to either the first elevated runway nor the second elevated runway.

* * * * *